United States Patent [19]
Hasegawa et al.

[11] Patent Number: 5,295,004
[45] Date of Patent: Mar. 15, 1994

[54] OPTICAL BEAM SCANNING APPARATUS

[75] Inventors: Shinya Hasegawa; Fumio Yamagishi; Youji Houki; Shigetake Iwata; Shigeo Kayashima; Satoshi Maeda, all of Kawasaki, Japan

[73] Assignee: Fujitsu Limited, Kawasaki, Japan

[21] Appl. No.: 972,520

[22] Filed: Nov. 6, 1992

[30] Foreign Application Priority Data

Nov. 8, 1991 [JP] Japan .................. 3-293140
Nov. 8, 1991 [JP] Japan .................. 3-293141

[51] Int. Cl.⁵ .................. G02B 5/32; G02B 26/10
[52] U.S. Cl. .................. 359/17; 359/18; 359/19
[58] Field of Search .................. 359/15, 17, 18, 19

[56] References Cited

U.S. PATENT DOCUMENTS

| | | | |
|---|---|---|---|
| 4,165,464 | 8/1979 | Ikeda et al. | 359/18 |
| 4,415,224 | 11/1983 | Dickson | 359/18 |
| 4,505,537 | 3/1985 | Funato | 359/18 |
| 4,600,266 | 7/1986 | Omi | 359/18 |
| 4,678,263 | 7/1987 | Funato | 359/18 |

FOREIGN PATENT DOCUMENTS

| | | |
|---|---|---|
| 59-116610 | 7/1984 | Japan . |
| 60-4922 | 1/1985 | Japan . |
| 62-234118 | 10/1987 | Japan . |
| 1-244420 | 9/1989 | Japan . |
| 2-244114 | 9/1990 | Japan . |

*Primary Examiner*—Martin Lerner
*Attorney, Agent, or Firm*—Staas & Halsey

[57] ABSTRACT

An optical beam scanning apparatus includes one rotatable hologram which is rotatable about an axis, and at least two laser beam sources which emit laser beams. The rotatable hologram is provided with at least two hologram areas whose number corresponds to the number of the laser beam sources, so that the laser beams emitted from the respective laser beam sources are made incident upon the respective hologram areas. Each of the hologram areas is provided with a plurality of hologram facets which are concentrically arranged with respect to the axis of rotation of the rotatable hologram to emit laser beams of the same F number. The hologram areas having different numbers of hologram facets having different F numbers.

18 Claims, 7 Drawing Sheets

OPTICAL BEAM SCANNING APPARATUS

BACKGROUND OF THE INVENTION

1. Field of the Invention

The present invention relates to an optical beam scanning apparatus which can be used, for example, in office automation equipment, such as a laser printer or a laser facsimile, or a laser plotter which is adapted to drawing, for example, a pattern of a semiconductor circuit, or a laser testing device which is adapted to checking for breakage of a wiring of a printed circuit board, etc.

2. Description of Related Art

Such a known optical beam scanning apparatus is usually comprised of a rotatable polygonal mirror and an f-θ lens in combination.

It is also known to use a hologram instead of the combination of the polygonal mirror and the f-θ lens to reduce the number of components and ease the required mechanical precision. Generally speaking, a hologram which is made of a thin film of a few μm is lighter and smaller than an optical lens, but has a wavefront conversion function or an aspherical lens function equivalent to or better than that of the optical lens.

In the optical beam scanning apparatus using the rotatable polygonal mirror and the f-θ lens to linearly scan an object with a laser beam, however, it is necessary not only to very precisely machine the rotatable polygonal mirror, but also to provide many lens groups including the f-θ lens which serves also as an optical system to correct the inclination of the lens surfaces, thus resulting in an increase in manufacturing cost.

For instance, Japanese Unexamined Patent Publication (Kokai) Nos. 62-234118 and 1-244420 disclose an optical beam scanner using a hologram disc which is adapted to effect a precise linear scanning of a laser beam whose aberration is fully corrected and which has a high resolution. Such a known optical beam scanner using a hologram disc satisfies the requirements of precision needed for a scanning optical system of a laser printer to obtain high quality printing.

There has recently been a need for realization of less expensive optical beam scanners having higher resolution. As is well known, the hologram can be inexpensively mass-produced by copying the same and has a very high resolution, and accordingly, the hologram can satisfactorily respond to this need.

Japanese Patent Application Serial No. 3-62961 assigned to the same assignee as the present application discloses an optical beam scanner having a high resolution. In this related application and as shown in FIG. 8 herein, the optical beam scanner is comprised of one laser source 50 (e.g., LD), one rotatable hologram disc 51, and one stationary hologram plate 52. The stationary hologram plate 52 is located between the rotatable hologram disc 51 and a surface 53 (e.g., photosensitive drum) to be scanned (referred to as a scanning surface). The hologram disc 51 has an annular hologram area which is uniformly divided into a plurality of identical hologram facets. The laser beam incident upon the rotatable hologram disc 51 from the LD 50 through a collimating lens 55 is converted to a scanning laser beam by the hologram facets 51a and is then made incident upon the stationary hologram plate 52, so that the scanning beams which are reduced are emitted therefrom. The reduced scanning beams are converged onto the scanning surface 53 to be imaged at an extremely high resolution. Numeral 90 designates a synchronizing photodetector which receives a beam from the hologram disc 51 through the hologram plate 52 to issue a printing start signal every time lines to be printed change.

It is sometimes required that the resolution is switched within one scanning beam. For instance, in a laser printer, it is necessary to switch the resolution of one scanning beam to print figures and/or letters, etc., at different dpi's (dots per inch). Looking at FIG. 2, there are two different printing information areas of 480 dpi and 600 dpi contained in one page of papers to be printed.

In theory, it is possible to realize two different resolutions by providing two light sources having different resolutions in an optical beam scanner employing a rotatable polygonal mirror, or by providing two hologram discs in an optical beam scanner employing a hologram, respectively. This, however, requires two beam scanning optical systems and independent adjustments thereof to prevent a possible deviation of the scanning beams of the respective beam scanning optical systems, thus resulting in a complex and expensive scanner. In addition, it is next to impossible to independently adjust the two beam scanning optical systems.

Furthermore, in a known optical beam scanner, as mentioned above, it is possible to switch the resolution only between different pages. Namely, it is only possible to print an image, for example, at 480 dpi on one page and another image, for example, at 600 dpi on another page.

Accordingly, it is still impossible to switch the resolution on the same page. Namely, images cannot be printed at different dpi's on one page.

The primary object of the present invention is to provide a simple optical beam scanner having a high resolution, wherein the resolution of the scanning beam can be easily switched, even within the same page, without a complex mechanism.

SUMMARY OF THE INVENTION

To achieve the object mentioned above, according to the present invention, there is provided an optical beam scanning apparatus including one rotatable hologram which is rotatable about an axis, comprising at least two laser beam sources which emit laser beams, said rotatable hologram being provided with at least two hologram areas, the number of which corresponds to the number of the laser beam sources, so that laser beams emitted from the respective laser beam sources are made incident upon the respective hologram areas, each of said hologram areas being provided with a plurality of hologram facets which are concentrically arranged with respect to the axis of rotation of the rotatable hologram to emit laser beams of the same F number, said hologram areas having different numbers of hologram facets having different F numbers.

According to another aspect of the present invention, there is provided an optical beam scanning apparatus including one rotatable hologram which is rotatable about an axis, comprising at least two laser beam sources which emit laser beams, said rotatable hologram being provided with at least two rotatable hologram areas, the number of which corresponds to the number of the laser beam sources, so that the laser beams emitted from the respective laser beam sources are made incident upon the respective hologram areas, each of said hologram areas being provided with a plurality of hologram facets which are concentrically arranged with respect to the axis of rotation of the rotatable hologram, said hologram areas having different numbers of hologram facets, and a stationary hologram having a plurality of stationary hologram areas upon which the laser beams emitted from the respective rotatable hologram areas, said stationary hologram areas having different F numbers.

BRIEF DESCRIPTION OF THE DRAWINGS

The invention will be described below in detail with reference to the accompanying drawings, in which.

DESCRIPTION OF THE PREFERRED EMBODIMENT

Figure 1:
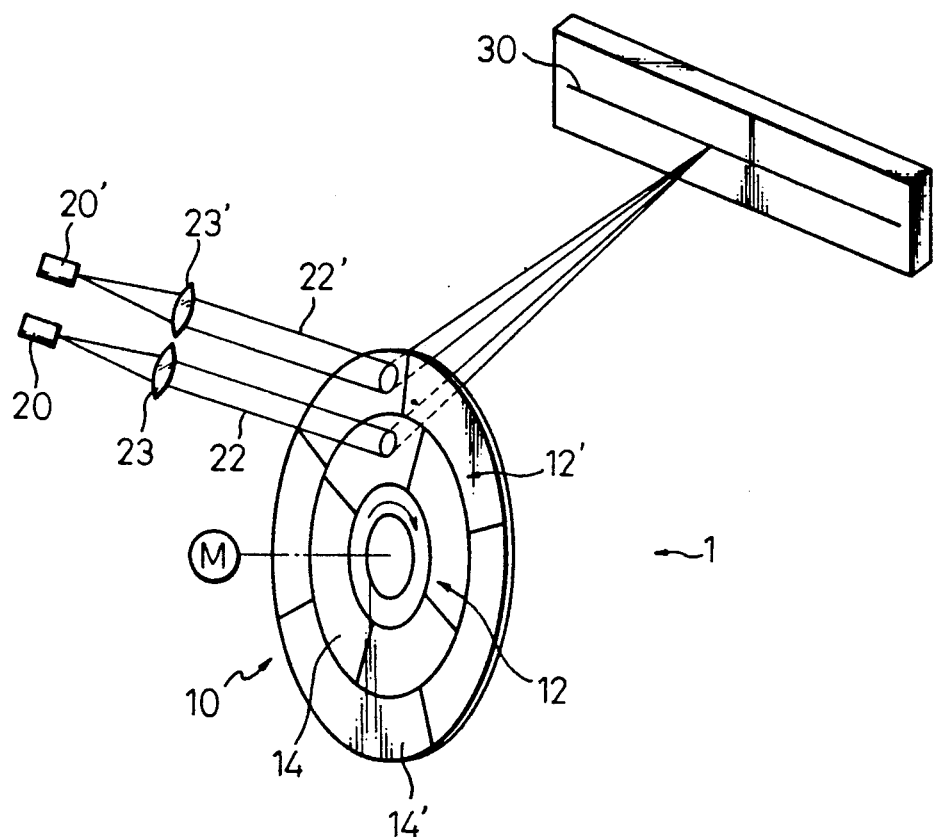
FIG. 1 is a schematic view showing the principle of an optical beam scanner according to an aspect of the present invention.

In FIG. 1 which shows the principle of the present invention, a beam scanner has a rotatable circular hologram disc 10 and two light sources 20 and 20' which emit laser beams 22 and 22', respectively. The light sources 20 and 20' are preferably identical to each other and emit the same wavelength of laser beams. The hologram disc 10 has two annular hologram areas 12 and 12' upon which the respective laser beams 22 and 22' are incident. The number of the hologram areas 12 and 12' corresponds to the number of the light sources 20 and 20'. Although there are two (i.e., first and second) laser beam sources 20 and 20' and two (i.e., first and second) hologram areas 12 and 12' in the illustrated embodiment, the number is not limited to two and can be more than two, depending on the number (kind) of the resolutions to be selected.

Each of the hologram areas 12 and 12' is comprised of a plurality of identical facets 14 and 14' which are concentrically arranged with respect to the axis of the hologram disc 10 about which the hologram disc rotates.

The F number of the facets 14 (relative to the scanning beam) and the number of the facets 14 of the hologram area 12 are different from those of the facets 14' of the hologram area 12'. Namely, in FIG. 1, the inner annular hologram area 12 consists of 4 identical sector facets 14 and the outer annular hologram area 12' consists of 5 identical sector facets 14', respectively. Consequently, the light sources 20 and 20' are selectively or simultaneously used to change the resolution of the scanning beam within the same scanning line, in accordance with printing data.

Each facet has a wavefront conversion function or an aspheric lens function. The F number is defined by (focal length of the hologram)/(diameter of the laser beam incident upon the facet) and thus relates to the hologram (or facets) to the scanning beam.

Preferably, the number of the facets 14' of the outer hologram area 12' is larger than the number of the facets 14 of the inner hologram area 12. Generally speaking, it is preferable that the F number of the facets of an outer hologram area be smaller than that of an inner hologram area.

Furthermore, the number of the facets of an outer hologram area is larger than that of an inner hologram area.

The wavelengths of the laser beams emitted from the laser beam sources 20 and 20' can be identical to each other. Alternatively, the wavelength of the laser beam emitted from the laser source corresponding to the outer hologram area can be shorter than the wavelength of the laser beam emitted from the laser source corresponding to the inner hologram area.

The hologram is not limited to a disc shape and can be, for example, a cone, truncated cone, circular column, cylinder, etc.

Each of the laser beam sources 20 and 20' is preferably made of a semiconductor laser which emits a laser beam of convergent, divergent or parallel waves.

The laser beam scanner according to the present invention can be advantageously applied to OA (Office Automation) equipment, such as a laser printer, or a laser facsimile, etc., a laser plotter, or laser testing machine, etc.

The diameter d of the scanning beam on the surface to be scanned is given by the following equation;

$$d = k \cdot \lambda \cdot F$$

wherein $\lambda$ represents the wavelength of the laser beam, F represents the F number of the facets relative to the scanning beam as above defined, and k represents a constant, depending on the vignetting of the associated optical system.

As mentioned above, in the present invention, the two (or more than two) hologram areas have different F numbers. This can be easily realized by providing lenses 23 and 23' which collimate the laser beams emitted by the laser sources 20 and 20' having different aperture diameters. Namely, the lens (e.g., 23') corresponding to the outer hologram area 12' has a larger aperture diameter than the lens (e.g., 23) corresponding to the inner hologram area 12, so that the laser beam corresponding to the outer hologram area has a larger resolution than the laser beam corresponding to the inner hologram area. Thus, the diameter (average diameter) d of the beams on the surface to be scanned can be varied within the same scanning line by switching the light sources to be activated.

Assuming that the number of the facets in a certain hologram area is N, the N scanning lines are obtained when the hologram disc rotates by one turn. Since the hologram areas have different numbers of facets, the numbers of the scanning lines (beams) obtained by the respective hologram areas are different from one another. Namely, since the scanning speed of the scanning beam per unit time is proportional to the number of the hologram facets, the scanning speed of the scanning beam can be varied in a hologram disc which rotates at a constant rotational speed.

As can be seen from the above discussion, according to the present invention, the average diameter and the scanning speed of the scanning beams on the surface to be scanned can be controlled by the rotating hologram disc.

Figure 3:
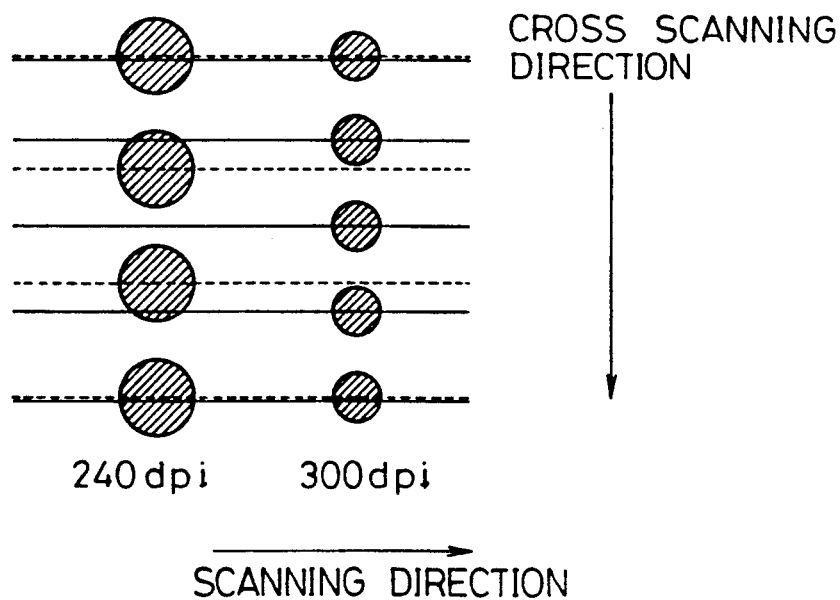
FIG. 3 is an explanatory view of the operation of an optical beam scanner according to the present invention.

Furthermore, according to the present invention, the distance of the printing dots between the scanning lines in the direction (cross scanning line) perpendicular to the scanning line can be varied. For instance, in FIG. 3, it is assumed that 5 scanning lines and 4 scanning lines are produced by the outer hologram area 12' and the inner hologram area 12 (FIG. 1), when one turn of the hologram disc 10 takes place, respectively, that is, the hologram disc has 5 outer facets 14' and 4 inner facets 14. The switching of the resolution in the scanning direction (same direction as the scanning direction) can be, as is well known, easily effected by switching the modulation frequency (video rate).

With respect to the resolution in the cross scanning direction, if the resolution of the beams produced by the inner hologram facets 14 (e.g., 4 facets, i.e., 4 scanning lines) is 240 dpi, the resolution of the beams produced by the outer hologram facets 14' (e.g., 5 facets, i.e., 5 scanning lines) is $240 \times (5/4) = 300$ dpi. Thus, the resolution in the cross scanning direction can be also switched.

Table 1 below shows an example of combinations of the facets, provided that the number of revolutions of the motor M (FIG. 1) of the rotatable hologram disc 10 is maintained constant.

TABLE 1

| Resolution | Ratio of Rotation of Motor | N rpm | 2N rpm | 2N/3 rpm | 4N/3 rpm | N/3 rpm | 2N/3 rpm |
|---|---|---|---|---|---|---|---|
| 200 dpi | 1 | | | 5 Facets | | 10 Facets | |
| 240 dpi | 1.2 | 4 Facets | | 6 Facets | | 12 Facets | |
| 300 dpi | 1.5 | 5 Facets | | | | 15 Facets | |
| 400 dpi | 2 | | | | 5 Facets | | 10 Facets |
| 480 dpi | 2.4 | | 4 Facets | | 6 Facets | | 12 Facets |
| 600 dpi | 3.0 | | 5 Facets | | | | 15 Facets |

In Table 1, N designates the number of revolutions of a drive motor M (FIG. 1) of the hologram disc 10.

As can be seen in Table 1, there are, for example, six combinations of resolutions which can be selected, as follows;

① 240 dpi; 240 dpi
② 240 dpi; 300 dpi
③ 200 dpi; 240 dpi; 300 dpi
④ 400 dpi; 480 dpi
⑤ 480 dpi; 600 dpi
⑥ 400 dpi; 480 dpi; 600 dpi Note that the former numeral represent the inner hologram area and the latter numeral the outer hologram area, respectively. In the combination ③ and ⑥, there are three hologram areas consisting of the inner annular hologram area 12, the outer annular hologram area 12', and an intermediate annular hologram area (not shown) between the inner and outer hologram areas.

As can be seen in Table 1, the resolution of the scanning beam can be varied within the same scanning line by switching the laser sources 20 and 20' (or more than two laser sources in case of more than two scanning lines) to be used.

Generally speaking, the average diameter of the laser beam incident upon the rotating hologram disc increases as the resolution becomes higher. As mentioned above, the average diameter of the scanning laser beam decreases and the resolution increases as the F number decreases. Consequently, it is preferable that the outer facets have a smaller F number than the inner facets, so that a high scanning efficiency can be maintained.

Furthermore, as mentioned above, since the scanning speed of the scanning beam can be increased when the outer hologram area has a larger number of facets than that of the inner hologram area, it is preferable that the outer hologram area has a larger number of facets than that of the inner hologram area to effectively and easily switch the resolution in the cross scanning direction.

The average diameter d of the scanning beam on the surface to be scanned is in proportion to the wavelength $\lambda$ of the laser beam, as mentioned above. Accordingly, preferably, the laser beam emitted from the laser source corresponding to the outer hologram has a shorter wavelength than the laser beam emitted from the laser source corresponding to the inner hologram area to obtain a smaller average diameter of a scanning beam.

In a preferred embodiment, the hologram disc 10 is made of a plastic disc substrate which is coated with a photoresist and is then subject to a pre-baking. To construct a hologram on the prebaked substrate, a reference wave (e.g., spherical wave of a laser beam) and an object wave (e.g., spherical wave of a laser beam) are made incident on the substrate (photoresist), and thereafter, the photoresist is developed.

The specifications of the first and second hologram areas 12 and 12', for example, are shown in Table 2 below.

TABLE 2

| | First Hologram Area | Second Hologram Area |
|---|---|---|
| Number of Facets | 4 | 5 |
| Average Distance | 30 mm | 50 mm |
| Focal Length of Facet | 300 mm | 300 mm |
| Average Diameter of Beams Incident Upon Facets | 6 | 7.5 |
| F number | 50 | 40 |

In Table 2, the average distance refers to an average distance between the axis of the hologram disc and the center of the beam (spot).

In an example, the wavelengths of the laser beam of the first and second laser sources (semiconductor lasers) 20 and 20' incident upon the first and second hologram areas 12 and 12' were both 780 nm. The hologram disc 10 was rotated at 9921.3 rpm by the motor M (FIG. 1). The diameters and the resolutions of the beams emitted by the first and second hologram areas 12 and 12' (first and second laser sources 20 and 20') on the surface to be scanned were 50 μm and 40 μm and 480 dpi and 600 dpi, respectively.

As can be understood from the foregoing, it is possible to print more than one kind of image (figures, letters, etc.) at different resolutions at one time within one page, for example, in a laser printer without changing the number of revolution of the rotatable hologram disc (i.e., the motor M thereof).

Furthermore, it is possible to vary the resolution in a scanning line by a simple mechanism using a single hologram.

Figure 4:
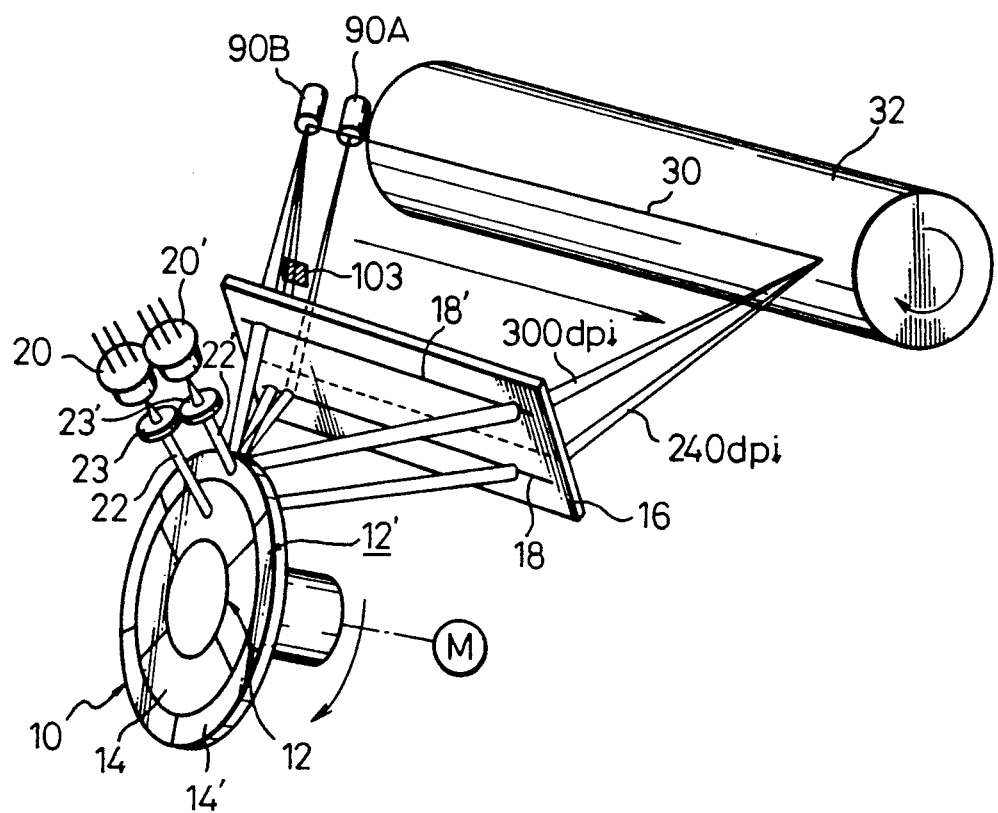
FIG. 4 is a schematic view showing the principle of an optical beam scanner according to another aspect of the present invention.

FIG. 4 shows a laser printer according to another aspect of the present invention in which provision is additionally made of at least one stationary hologram plate 16 between the rotatable hologram disc 10 and the surface 32 (e.g., photosensitive drum) to be scanned. The other structure is basically the same as the arrangement shown in FIG. 1.

The stationary hologram plate 16 has stationary hologram areas 18 and 18' the number of which corresponds to the number of the laser sources 20 and 20'. In the illustrated embodiment, there are two stationary hologram areas 18 and 18' on which the laser beams emitted from the rotating hologram areas 12 and 12' are incident, respectively. The stationary hologram areas 18 and 18' have different F numbers, similar to the hologram areas 12 and 12' of the rotatable hologram disc 10.

Alternatively, it is also possible to provide a plurality of stationary hologram plates 16, each having a stationary hologram area 18 or 18'. The stationary hologram areas of the separate stationary hologram plates have different F numbers. The number of the stationary hologram plates does not necessarily correspond to the number of the laser sources 20 and 20'. The essential requirement is that the number of the stationary hologram areas be identical to the number of the light sources.

The stationary hologram areas 18 and 18' have a wavefront conversion function or an aspheric lens function. The F number of the stationary hologram area is defined by (focal length of the stationary hologram area)/(a diameter of the laser beam incident upon the stationary hologram area).

The interference fringes (hologram) formed on the stationary hologram areas can be either an off-axis hologram or symmetrical with respect to the axis thereof, so that the laser beams emitted from the stationary hologram areas are converged on one scanning line.

The diameter d of the scanning beams is given by;

$$d = K \cdot \lambda \cdot F$$

wherein $\lambda$ designates the wavelength of the laser beam, F represents the F number of the stationary hologram, and K represents a constant depending on the vignetting of the associated optical system.

In the embodiment illustrated in FIG. 4, since the stationary hologram areas have different F numbers, the diameter of the laser beam can be varied within the same scanning line, for example, by selectively using the light sources.

Figure 5:
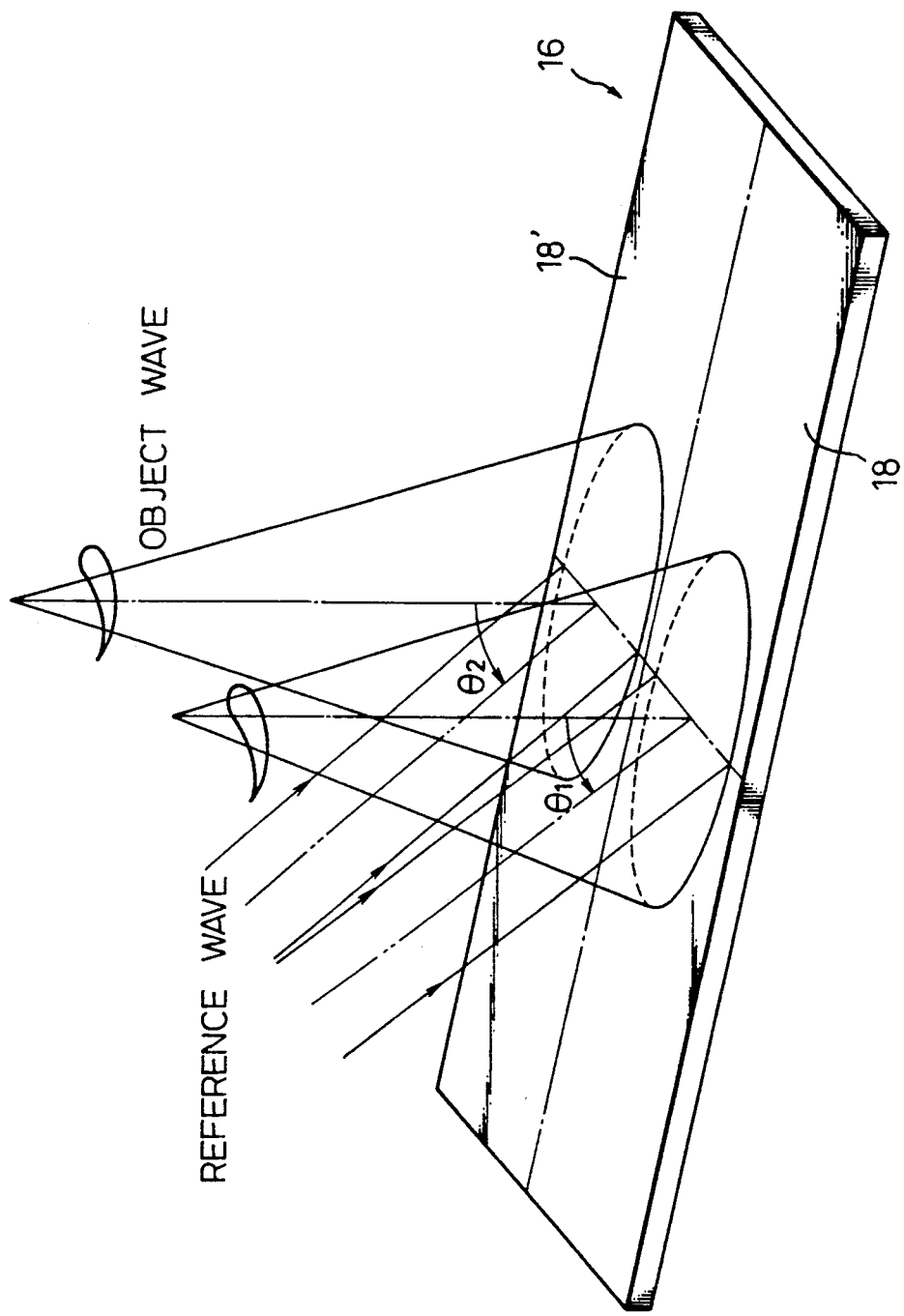
FIG. 5 is an explanatory view of a formation of a stationary hologram plate shown in FIG. 4.

Each of the stationary hologram areas 18 and 18' are constructed by an interference of a reference wave and object wave (e.g., both being a spherical convergent wave), as shown in FIG. 5. The incident angles $\theta 1$ and $\theta 2$ of the reference waves are different from one another.

The stationary hologram also makes it possible to reduce the diameter of the scanning beam to an extremely small value to thereby increase the resolution.

In an example, the specifications of the first and second stationary hologram areas 18 and 18' are shown in Table 3 below.

TABLE 3

|  | First Stationary Hologram | Second Stationary Hologram |
|---|---|---|
| Focal length of Stationary Hologram | 250 mm | 250 mm |
| Average Diameter of Laser Beam Incident on Stationary Hologram | 5 mm | 6.25 mm |
| F number | 50 | 40 |

Figure 6:
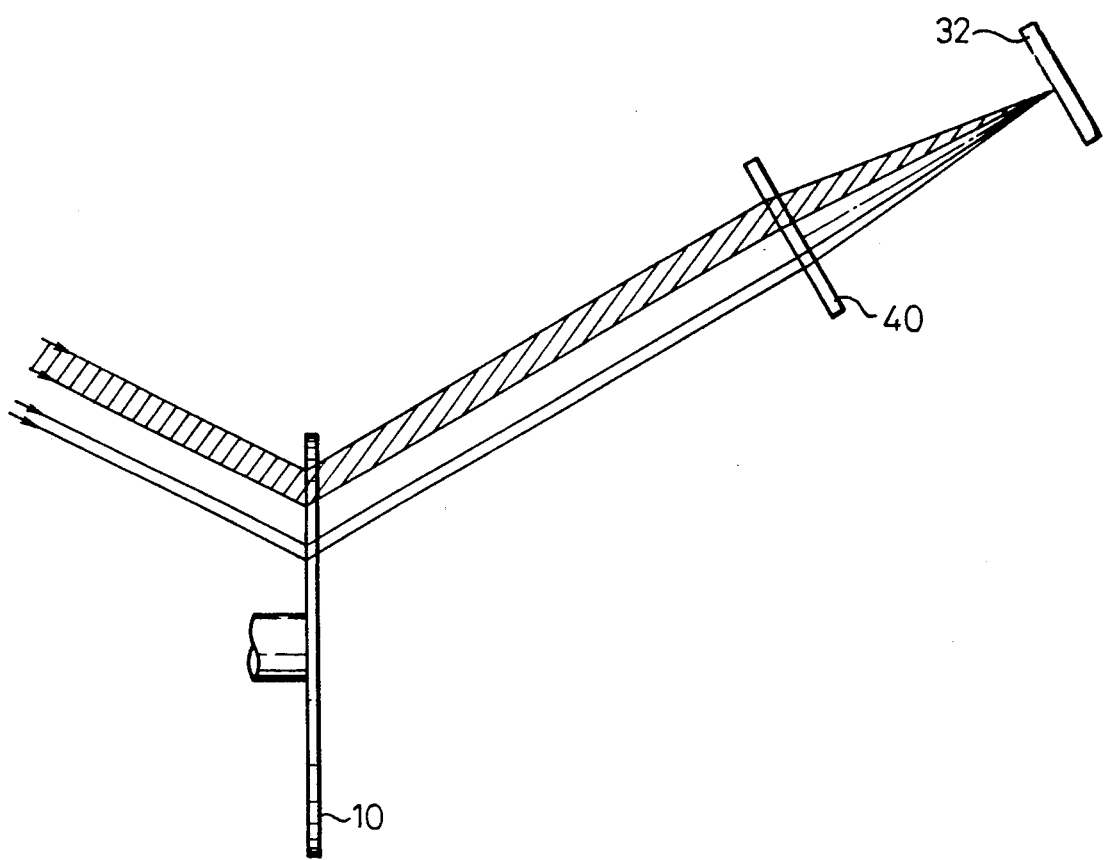
FIG. 6 is a schematic view showing the principle of an optical beam scanner according to still another aspect of the present invention.

The stationary hologram 16 shown in FIG. 4 is an off-axis hologram. Instead, it is possible to use a stationary hologram 40 which is symmetrical with respect to the axis, as shown in FIG. 6. The axial symmetrical stationary hologram referred to means a hologram whose interference fringes (infringe distribution) are symmetrical with respect to a line normal to the surface of the plate at the center of the stationary hologram. The axial symmetrical stationary hologram can be more easily manufactured and adapted to the beam scanner than the off-axis hologram, and contributes to a minimization of the optical system.

The stationary hologram can be optimized to prevent the positional deviation of the scanning beam due to the fluctuation of the semiconductor laser.

To this end, the deviation of the scanning line due to the fluctuation of the wavelength of the laser diode can be eliminated by minimizing the difference in the optical path of the laser beam transmitted through the rotatable hologram disc 10 and emitted from the stationary hologram plate 16 to be converged onto the scanning line at each scanning point, as is well known.

Figure 7:
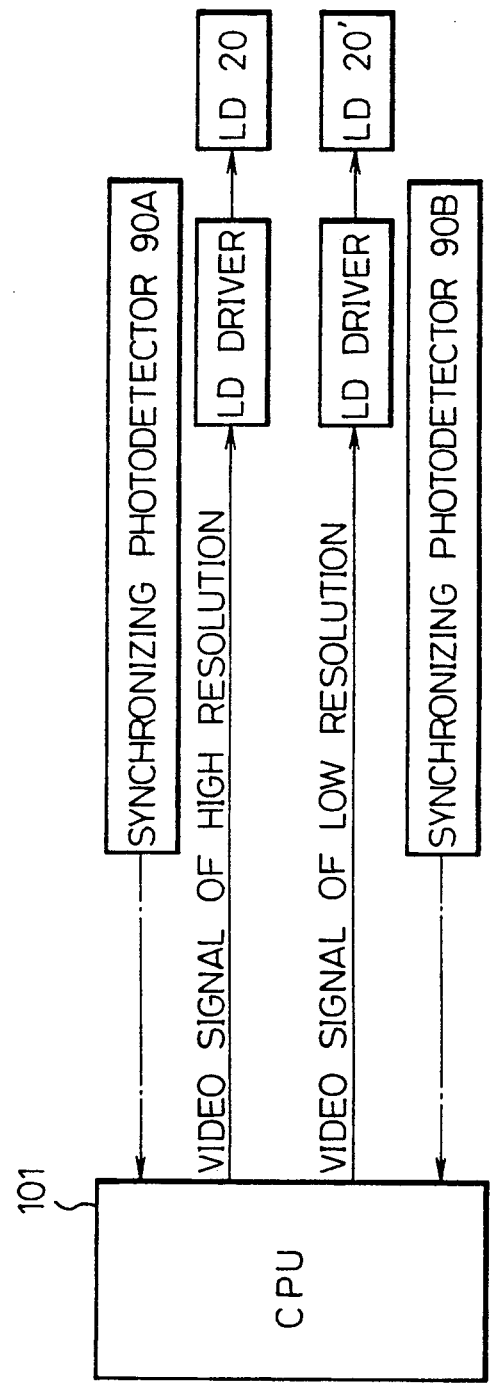
FIG. 7 is a block diagram of a control of two different images at different dpi's according to the present invention; and, FIG. 8 is a schematic view of a known optical beam scanner.

FIG. 7 shows a block diagram of a control of the printing by a laser printer according to the present invention.

Figure 8:
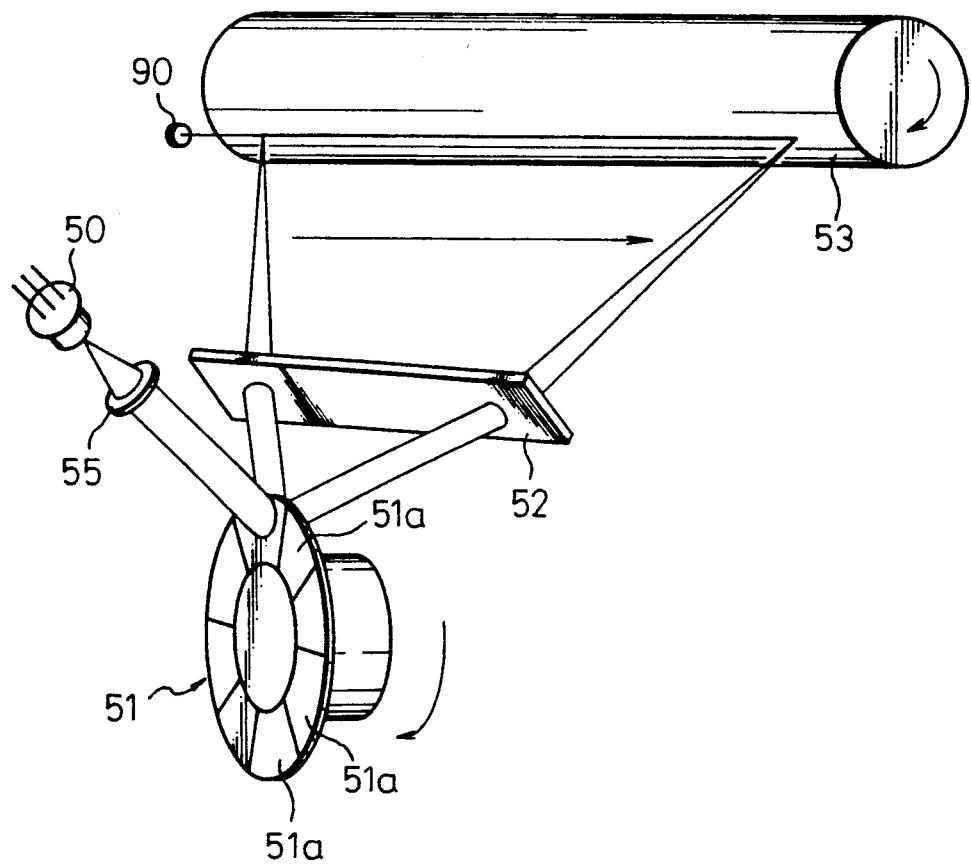

Since the subject of the present invention is not directed to a control method, no detailed explanation therefor is given herein. In FIG. 7, the printing is controlled by a known controller (e.g., computer) 101 per se which issues video signals of high resolution (e.g., 300 dpi) and low resolutions (e.g., 240 dpi) in response to the synchronization signals which are sent from the synchronizing photodetectors 90A and 90B (corresponding to the synchronizing photodetector 90 in FIG. 8) when they receive the laser beams from the hologram disc 10, in accordance with predetermined printing data. The photodetector 90A receives the laser beams of low resolution (e.g., 240 dpi) and the photodetector 90B receives the laser beams of high resolution (e.g., 300 dpi). The laser sources 20 and 20' correspond to the photodetectors 90A and 90B, respectively. As soon as the left photodetector 90B detects the laser beams of 300 dpi, the corresponding LD 20' is turned OFF, so that the latter are not received by the right photodetector 90A. On the other hand, a light intercepter 103 is provided in an optical path of the laser beams of low resolution connected to the left photodetector 90B to intercept the laser beam of low resolution emitted from the hologram plate 16. Thus, the laser beams of low resolution are not made incident upon the left photodetector 90B and are received only by the right photodetector 90A, so that the latter detects the laser beams of 240 dpi.

Figure 2:
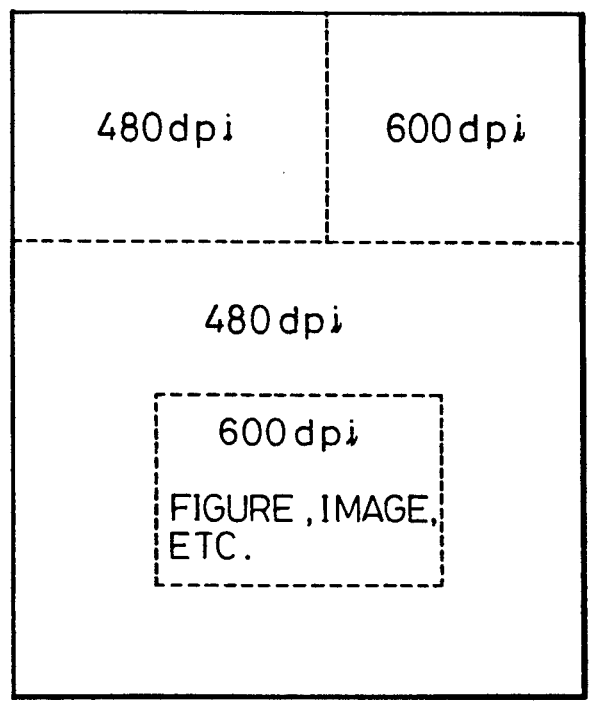
FIG. 2 is a front elevational view showing two different images of figures and letters to be printed in a mixture at different dpi's on a single page, by way of example.

For instance, in an example shown in FIG. 2, the CPU 101 includes two independent print controlling portions for 480 dpi and 600 dpi, which can operate in parallel. For 480 dpi, the print controlling portion operates in response to the printing start signal in accordance with the printing date therefor. Similarly, for 600 dpi, the print controlling portion operates in response to the printing start signal in accordance with the printing date therefor, independently of the operation of the 480 dpi. The host computer (CPU) also issues predetermined respective print completion signals.

It is possible to provide a single photodetector 90 (FIG. 8) which selectively detects both the laser beams of high and low resolutions. In such an alternative, the control is made in such a way that the photodetector 90 receives the laser beams of high and low resolutions, for example, at different timings.

We claim:

1. An optical beam scanning apparatus including one rotatable hologram which is rotatable about an axis, comprising:
   at least two laser beam sources which emit respective laser beams;
   said rotatable hologram having at least two hologram areas, the number of hologram areas corresponding to the number of laser beam sources and the respective laser beams emitted from the at least two laser beam sources being incident on the respective, at least two hologram areas, and
   said at least two hologram areas, each having a plurality of hologram facets, being concentrically arranged with respect to the axis of rotation of the rotatable hologram thereby to emit the respective laser beams having the same F number; and having respective, different numbers of hologram facets having respective, different F numbers.

2. An optical beam scanning apparatus according to claim 1, wherein said rotatable hologram comprises a circular hologram disc on which the at least two hologram areas are defined in respective, concentric annular areas.

3. An optical beam scanning apparatus according to claim 2, wherein said at least two hologram areas comprises an outer hologram area and an inner hologram area and wherein the facets of the outer hologram area have a smaller F number than that of the facets of the inner hologram area.

4. An optical beam scanning apparatus according to claim 3, wherein the outer hologram area has a larger number of hologram facets than the number of hologram facets of the inner hologram area.

5. An optical beam scanning apparatus according to claim 1, wherein the at least two laser beam sources are identical and emit respective laser beams having the same wavelength.

6. An optical beam scanning apparatus according to claim 1, wherein the laser beam sources emit respective laser beams of corresponding different wavelengths.

7. An optical beam scanning apparatus according to claim 6, wherein the laser beam source corresponding to the outer hologram area of the rotatable hologram disc emits a laser beam of a shorter wavelength than the wavelength of the laser beam emitted by the laser beam source corresponding to the inner hologram area of the rotatable hologram disc.

8. An optical beam scanning apparatus according to claim 1, wherein said at least two hologram areas define respective, different resolutions of printing data.

9. An optical beam scanning apparatus according to claim 8, wherein said different resolutions of printing data are contained in one medium to be printed.

10. An optical beam scanning apparatus including one rotatable hologram which is rotatable about an axis, comprising:
    at least two laser beam sources which emit respective laser beams;
    said rotatable hologram having at least two hologram areas, the number of hologram areas corresponding to the number of laser beam sources and the respective laser beams emitted from the at least two laser beam sources being incident on the respective, at least two hologram areas;
    said at least two hologram areas, each having a plurality of hologram facets, being concentrically arranged with respect to the axis of rotation of the rotatable hologram and having respective, different numbers of hologram facets; and
    a stationary hologram having a plurality of stationary hologram areas upon which the at least two laser beams emitted from the respective at least two rotatable hologram areas are incident, said stationary hologram areas having respective, different F numbers.

11. A optical beam scanning apparatus according to claim 10, wherein said stationary hologram comprises a single hologram plate.

12. An optical beam scanning apparatus according to claim 11, wherein said single hologram plate has an interference fringe which is symmetrical with respect to the optical axis thereof, thereby to converge the at least two laser beams incident thereon onto a common scanning line.

13. An optical beam scanning apparatus according to claim 10, wherein said rotatable hologram comprises a circular hologram disc on which the at least two hologram areas are defined in respective, concentric annular areas.

14. An optical beam scanning apparatus according to claim 13, wherein said at least two hologram areas comprise an outer hologram area and an inner hologram area and wherein the facets of the outer hologram area have a smaller F number than that of the facets of the inner hologram area.

15. An optical beam scanning apparatus according to claim 14, wherein the outer hologram area has a larger number of hologram facets than the number of hologram facets of the inner hologram area.

16. An optical beam scanning apparatus according to claim 13, wherein the at least two laser beam sources are identical and emit laser beams having the same wavelength.

17. An optical beam scanning apparatus according to claim 13, wherein the laser beam sources emit respective laser beams of corresponding, different wavelengths.

18. An optical beam scanning apparatus according to claim 17, wherein the laser beam source corresponding to the outer hologram area of the rotatable hologram disc emits a laser beam of a shorter wavelength than the wavelength of the laser beam emitted by the laser beam source corresponding to the inner hologram area of the rotatable hologram disc.

* * * * *

UNITED STATES PATENT AND TRADEMARK OFFICE
CERTIFICATE OF CORRECTION

PATENT NO. : 5,295,004
DATED : Mar. 15, 1994
INVENTOR(S) : HASEGAWA et al.

It is certified that error appears in the above-indentified patent and that said Letters Patent is hereby corrected as shown below:

Col. 9, line 40, change "F number;" to --F number,--.

Signed and Sealed this

Ninth Day of August, 1994

Attest:

BRUCE LEHMAN

Attesting Officer

Commissioner of Patents and Trademarks